(12) United States Patent
Yin et al.

(10) Patent No.: US 11,995,291 B2
(45) Date of Patent: May 28, 2024

(54) SYSTEMS AND METHODS OF AUTOMATICALLY IDENTIFYING A DATE IN A GRAPHICAL USER INTERFACE

(71) Applicant: MICRO FOCUS LLC, Santa Clara, CA (US)

(72) Inventors: Peng-Ji Yin, Shanghai (CN); Gaoyang Zhou, Shanghai (CN); YunSheng Liu, Shanghai (CN)

(73) Assignee: Micro Focus LLC, Santa Clara, CA (US)

( * ) Notice: Subject to any disclaimer, the term of this patent is extended or adjusted under 35 U.S.C. 154(b) by 0 days.

(21) Appl. No.: 17/843,576

(22) Filed: Jun. 17, 2022

(65) Prior Publication Data
US 2023/0409167 A1    Dec. 21, 2023

(51) Int. Cl.
*G06F 3/0482* (2013.01)

(52) U.S. Cl.
CPC .................. *G06F 3/0482* (2013.01)

(58) Field of Classification Search
CPC .............. G06F 3/0482; G06V 30/1444; G06V 30/1448; G06V 30/1452; G06V 30/00; G06V 30/10; G06V 30/416; G06V 30/40; G06V 30/41
See application file for complete search history.

(56) References Cited

U.S. PATENT DOCUMENTS

| | | | | |
|---|---|---|---|---|
| 6,012,037 | A * | 1/2000 | Yoshikawa | G06F 15/0266 708/163 |
| 6,275,810 | B1 * | 8/2001 | Hetherington | G06Q 10/1093 709/224 |
| 10,474,887 | B2 * | 11/2019 | Levin | G06V 30/412 |
| 2009/0133000 | A1 * | 5/2009 | Sweis | G06F 11/3688 717/124 |
| 2011/0205370 | A1 * | 8/2011 | Griffin | H04N 1/00045 348/335 |
| 2013/0027430 | A1 * | 1/2013 | Matsuda | G06T 19/006 345/633 |
| 2017/0032558 | A1 * | 2/2017 | Mason, Jr. | G06V 30/412 |
| 2017/0090693 | A1 * | 3/2017 | Ku | G06F 3/04842 |
| 2019/0095708 | A1 * | 3/2019 | Ormond | G06V 10/17 |
| 2021/0272069 | A1 * | 9/2021 | Douglas | G06Q 10/06314 |
| 2022/0051270 | A1 * | 2/2022 | Benkreira | G06F 40/40 |

FOREIGN PATENT DOCUMENTS

| | | | | |
|---|---|---|---|---|
| CN | 113190116 A | * | 7/2021 | |
| EP | 2362327 A1 | * | 8/2011 | G06K 9/2054 |
| KR | 20090017094 A | * | 2/2009 | G06V 10/22 |

* cited by examiner

*Primary Examiner* — Dino Kujundzic
(74) *Attorney, Agent, or Firm* — Sheridan Ross P.C.

(57) ABSTRACT

Systems and methods include determining a target date; detecting a calendar in a graphical user interface; recognizing a month name in the detected calendar; recognizing one or more date numbers in the detected calendar; identifying a week start day for the detected calendar; identifying a position in the detected calendar associated with the target date based on the identified week start day for the detected calendar and the recognized one or more date numbers in the detected calendar; and automatically selecting the position in the detected calendar associated with the target date.

20 Claims, 10 Drawing Sheets

SYSTEMS AND METHODS OF AUTOMATICALLY IDENTIFYING A DATE IN A GRAPHICAL USER INTERFACE

FIELD OF THE DISCLOSURE

The invention relates generally to systems and methods for analyzing graphical user interfaces and particularly to identifying a date in a graphical user interface.

BACKGROUND

Artificial intelligence (AI) is increasingly becoming a backbone of development of software tools. Through the use of AI, users can create software systems which save users time and money and enable the performance of functions not previously possible.

Codeless artificial intelligence is a powerful tool enabling users to quickly create systems relying on AI and machine learning (ML) without being required to start each project from scratch or being computer programming experts.

One feature of codeless AI is text association. Text association in codeless AI is designed to help users quick find desired controls from a graphical user interface (GUI) or to automatically find a desired portion of a GUI.

For example, a user may seek to create a computer program which automatically clicks a GUI button labeled "CONTINUE." Using text association, a codeless AI project can process an input GUI image and locate any instance of the word "CONTINUE." Furthermore, the codeless AI project may be capable of identifying an instance of the word "CONTINUE" in which the instance is alone surrounded by a bounding box. Such an instance may be identified by the codeless AI project as being a GUI button labeled "CONTINUE."

Contemporary text association in codeless AI relies on both image recognition, such as through the use of convolutional neural networks (CNNs) or other AI tools, and text recognition, such as through the use of optical character recognition (OCR). Using visual relation identifiers, contemporary text association tools are capable of uniquely locating controls, such as GUI buttons or other GUI elements, or text.

However, contemporary text association, by relying upon image recognition and text recognition, is less effective for locating text and GUI elements from within a section of dense text and controls. For example, a common web control is a calendar menu. A calendar menu typically includes a grid of day names and date numbers arranged closely together. The date numbers of a calendar are often repeated. For a given menu showing a calendar of a single month, there may be date numbers for a preceding or following month. For example, the last few days of the previous month and the first few days of the following month may be included in the menu for a particular calendar month.

Automated methods of selecting dates from GUI calendars is a necessary technology. For example, automated methods of selecting dates may be used to automatically test website features. Automated methods of testing website features are faster, more efficient, and more accurate than manual methods of testing websites. However, contemporary methods of selecting dates from GUI calendars suffer from inaccuracy setbacks.

GUI calendar menus contain rows and columns of numbers close in proximation. Moreover, a single calendar month contains dates with repeating numbers, e.g., 21, 22, 23, etc. Even when numbers can be identified on a GUI calendar menu, recognizing which numbers are associated to which date is an issue. For example, if a computer system is to select a date of March 3, the computer system must select between the threes of each of March 3, 13, 23, 30, and 31. For this reason, the dense text and controls and repeated numbers of the calendar menu present a distinct problem for codeless AI: How to select a correct date from within a calendar menu of a GUI.

SUMMARY

These and other needs are addressed by the various embodiments and configurations of the present invention. The present invention can provide a number of advantages depending on the particular configuration. These and other advantages will be apparent from the disclosure of the invention(s) contained herein.

In one embodiment, a method for automatically selecting a target date in a GUI calendar comprises determining a target date; detecting a calendar in a graphical user interface (GUI); recognizing a month name in the detected calendar; recognizing one or more date numbers in the detected calendar; identifying a week start day for the detected calendar; identifying a position in the detected calendar associated with the target date based on the identified week start day for the detected calendar and the recognized one or more date numbers in the detected calendar; and automatically selecting the position in the detected calendar associated with the target date.

In one embodiment, a computer system comprises a processor; and a computer-readable storage medium storing computer-readable instructions which, when executed by a processor, cause the processor to execute a method, the method comprising: determining a target date; detecting a calendar in a graphical user interface (GUI); recognizing a month name in the detected calendar; recognizing one or more date numbers in the detected calendar; identifying a week start day for the detected calendar; identifying a position in the detected calendar associated with the target date based on the identified week start day for the detected calendar and the recognized one or more date numbers in the detected calendar; and automatically selecting the position in the detected calendar associated with the target date.

In one embodiment, a computer program product comprises a non-transitory computer-readable storage medium having computer-readable program code embodied therewith, the computer-readable program code configured, when executed by a processor, to execute a method, the method comprising: determining a target date; detecting a calendar in a graphical user interface (GUI); recognizing a month name in the detected calendar; recognizing one or more date numbers in the detected calendar; identifying a week start day for the detected calendar; identifying a position in the detected calendar associated with the target date based on the identified week start day for the detected calendar and the recognized one or more date numbers in the detected calendar; and automatically selecting the position in the detected calendar associated with the target date.

In some embodiments, the method may include determining a rank and a column associated with the target date. In some embodiments, the column is determined based at least in part on the recognized week start day. In some embodiments, the rank and the column are determined based on a database entry. In some embodiments, identifying the position in the detected calendar associated with the target date comprises locating the rank in the detected calendar. In some embodiments, the rank is located using one or more of upward and downward speculation. In some embodiments, the position in the detected calendar associated with the target date is identified based on the rank and the column. In some embodiments, one or more of the month name, date numbers, and week start day are recognized using OCR. In some embodiments, identifying the week start day for the detected calendar comprises: using OCR to recognize one of Tuesday, Wednesday, Thursday, Friday, and Saturday; determining a column number for the recognized one of Tuesday, Wednesday, Thursday, Friday, and Saturday; and determining, based on the column number for the recognized one of Tuesday, Wednesday, Thursday, Friday, and Saturday, a first column is associated with one of Sunday and Monday. In some embodiments, identifying the position in the detected calendar associated with the target date comprises generating a grid of squares. In some embodiments, identifying the position in the detected calendar associated with the target date further comprises determining a block size based on a distance between two recognized date numbers in the detected calendar. In some embodiments, each square of the grid of squares is associated with a date in the detected calendar. In some embodiments, selecting the position in the detected calendar comprises moving a cursor to the position in the detected calendar.

A system on a chip (SoC) including any one or more of the above embodiments or aspects of the embodiments described herein.

One or more means for performing any one or more of the above embodiments or aspects of the embodiments described herein.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

Any of the above embodiments or aspects, wherein the data storage comprises a non-transitory storage device, which may further comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

It is to be appreciated that any feature described herein can be claimed in combination with any other feature(s) as described herein, regardless of whether the features come from the same described embodiment.

BRIEF DESCRIPTION OF THE DRAWINGS

The present disclosure is described in conjunction with the appended figures:

FIG. 2A-G are illustrations of an example calendar GUIs in accordance with one or more of the embodiments described herein;

DETAILED DESCRIPTION

Figure 1:
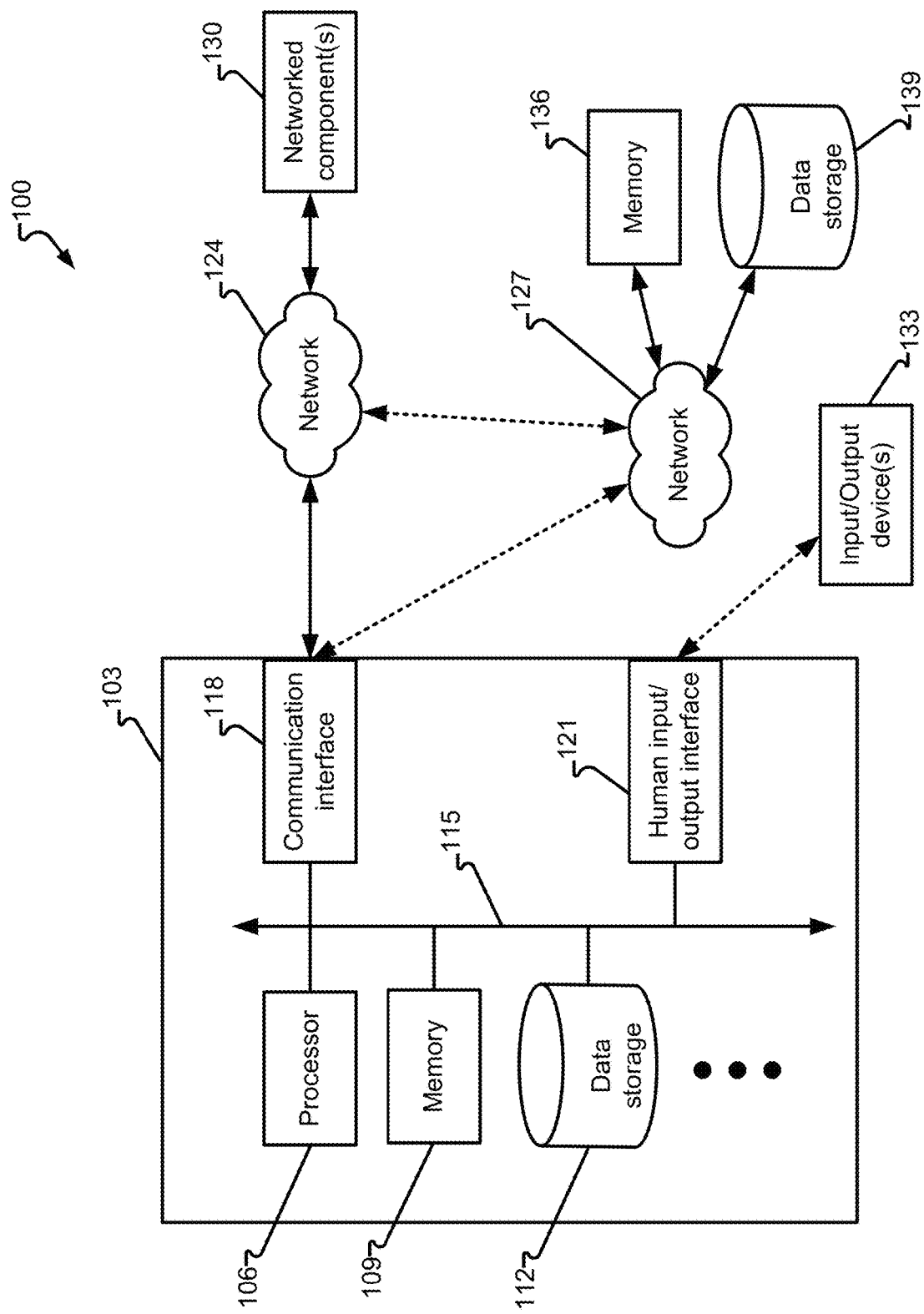
FIG. 1 is an illustration of a computing environment in accordance with one or more of the embodiments described herein.

Using a system or method as described herein, a correct date may be identified from within a GUI calendar using the systems and methods described herein. The systems and methods described herein use calendar layouts and formatting to identify calendar characteristics and locate a date from within a calendar. In certain embodiments, a certainty as to whether the location of the date is correct may be generated. The systems and methods described herein may be adapted to any number of cultures and platforms.

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with the like reference number. When such a reference is made in the singular form, but without identification of the sub-reference identifier, is a reference to one of the like numbered elements, but without limitation as to the particular one of the elements being referenced. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably, and include any type of methodology, process, mathematical operation, or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

For purposes of explanation, numerous details are set forth in order to provide a thorough understanding of the present disclosure. It should be appreciated, however, that the present disclosure may be practiced in a variety of ways beyond the specific details set forth herein.

FIG. 1 depicts a computing device 103 in a computing environment 100 in accordance with embodiments of the present disclosure. In one embodiment, a device for identifying dates in GUIs may be embodied, in whole or in part, as computing device 103 comprising various components and connections to other components and/or systems. The components are variously embodied and may comprise processor 106. The term "processor," as used herein, refers exclusively to electronic hardware components comprising electrical circuitry with connections (e.g., pin-outs) to convey encoded electrical signals to and from the electrical circuitry. Processor 106 may comprise programmable logic functionality, such as determined, at least in part, from accessing machine-readable instructions maintained in a non-transitory data storage, which may be embodied as circuitry, on-chip read-only memory, memory 109, data storage 112, etc., that cause the processor 106 to perform steps of the instructions. Processor 106 may be further embodied as a single electronic microprocessor or multi-processor device (e.g., multicore) having electrical circuitry therein which may further comprise a control unit(s), input/output unit(s), arithmetic logic unit(s), register(s), primary memory, and/or other components that access information (e.g., data, instructions, etc.), such as received via bus 115, executes instructions, and outputs data, again such as via bus 115. In other embodiments, processor 106 may comprise a shared processing device that may be utilized by other processes and/or process owners, such as in a processing array within a system (e.g., blade, multi-processor board, etc.) or distributed processing system (e.g., "cloud," farm, etc.). It should be appreciated that processor 106 is a non-transitory computing device (e.g., electronic machine comprising circuitry and connections to communicate with other components and devices). Processor 106 may operate a virtual processor, such as to process machine instructions not native to the processor (e.g., translate a VAX operating system and VAX machine instruction code set into chipset code to enable VAX-specific applications to execute on a virtual VAX processor), however, as those of ordinary skill understand, such virtual processors are applications executed by hardware, more specifically, the underlying electrical circuitry and other hardware of the processor (e.g., processor 106). Processor 106 may be executed by virtual processors, such as when applications (i.e., Pod) are orchestrated by Kubernetes. Virtual processors enable an application to be presented with what appears to be a static and/or dedicated processor executing the instructions of the application, while underlying non-virtual processor(s) are executing the instructions and may be dynamic and/or split among a number of processors.

In addition to the components of processor 106, computing device 103 may utilize memory 109 and/or data storage 112 for the storage of accessible data, such as instructions, values, etc. Communication interface 118 facilitates communication with components, such as processor 106 via bus 115 with components not accessible via bus 115. Communication interface 118 may be embodied as a network port, card, cable, or other configured hardware device. Additionally, or alternatively, human input/output interface 121 connects to one or more interface components to receive and/or present information (e.g., instructions, data, values, etc.) to and/or from a human and/or electronic device. Examples of input/output devices 133 that may be connected to input/output interface include, but are not limited to, keyboard, mouse, trackball, printers, displays, sensor, switch, relay, speaker, microphone, still and/or video camera, etc. In another embodiment, communication interface 118 may comprise, or be comprised by, human input/output interface 121. Communication interface 118 may be configured to communicate directly with a networked component or utilize one or more networks, such as network 124 and/or network 127.

Network 124 may be a wired network (e.g., Ethernet), a wireless network (e.g., Wi-Fi, Bluetooth, cellular, etc.), or a combination thereof and may enable computing device 103 to communicate with networked component(s) 130. In other embodiments, network 124 may be embodied, in whole or in part, as a telephony network (e.g., public switched telephone network (PSTN), private branch exchange (PBX), cellular telephony network, etc.).

Additionally, or alternatively, one or more other networks may be utilized. For example, network 127 may represent a second network, which may facilitate communication with components utilized by computing device 103. For example, network 127 may be an internal network to a business entity or other organization, whereby components are trusted (or at least trusted to a degree), where networked component(s) 130 connected to a public network (e.g., Internet) such as network 124 may not be trusted (or at least trusted to a lesser degree).

Components attached to network 127 may include memory 136, data storage 139, input/output device(s) 133, and/or other components that may be accessible to processor 106. For example, memory 136 and/or data storage 139 may supplement or supplant memory 109 and/or data storage 112 entirely or for a particular task or purpose. As another example, memory 136 and/or data storage 139 may be an external data repository (e.g., server farm, array, "cloud," etc.) and enable computing device 103, and/or other devices, to access data thereon. Similarly, input/output device(s) 133 may be accessed by processor 106 via human input/output interface 121 and/or via communication interface 118 either directly, via network 127, via network 124 alone (not shown), or via networks 127 and 124. Each of memory 109, data storage 112, memory 136, data storage 139 comprise a non-transitory data storage comprising a data storage device.

It should be appreciated that computer-readable data may be sent, received, stored, processed, and presented by a variety of components. It should also be appreciated that components illustrated may control other components, whether illustrated herein or otherwise. For example, one input/output device 133 may be a router, switch, port, or other communication component such that a particular output of processor 106 enables (or disables) input/output device 133, which may be associated with network 124 and/or network 127, to allow or disallow communications between two or more nodes on network 124 and/or network 127. One of ordinary skill in the art will appreciate that other communication equipment may be utilized, in addition or as an alternative, to those described herein without departing from the scope of the embodiments.

As a result, and in one embodiment, processor 106 may execute instructions to perform the systems and methods described herein. In another embodiment, networked component(s) 130 may execute one or more systems and methods while processor 106 may execute one or more other systems and methods. Memory values may be read from memory 109 or a memory of one or more network component(s) 130. In another embodiment, outputs from systems and methods as described herein may be maintained in memory 136 and/or data storage139.

Figure 2A:
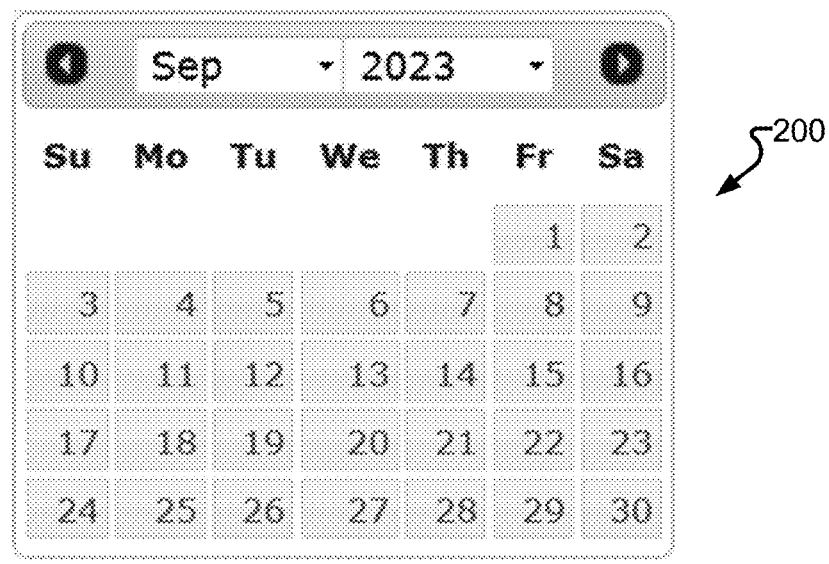

As illustrated in FIG. 2A-G, a GUI calendar may take a number of forms. For example, as illustrated in FIG. 2A, a GUI calendar 200 may show a month and year and list the days of the month. Abbreviated days of the week may appear on a top row. The week may begin on a Sunday. The calendar may comprise five ranks.

Figure 2B:
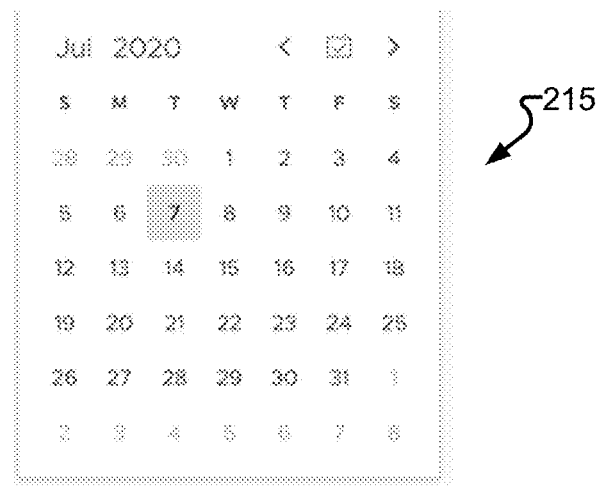

As illustrated in FIG. 2B, a GUI calendar 215 may also show dates preceding and following the days of the month. In the example illustrated in FIG. 2B, the 28th, 29th, and 30th, of the previous month and the first through eighth of the next month may be displayed. The calendar 215 of FIG. 2B comprises six ranks, including a full week of dates not associated with the month of the calendar 215. Unlike the abbreviated days of the week of the calendar 200 of FIG. 2A, the days of the week of the calendar 215 of FIG. 2B are listed by only first letter.

Figure 2C:
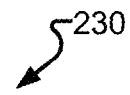
Figure 2D:
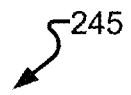
Figures 2E, 2F:
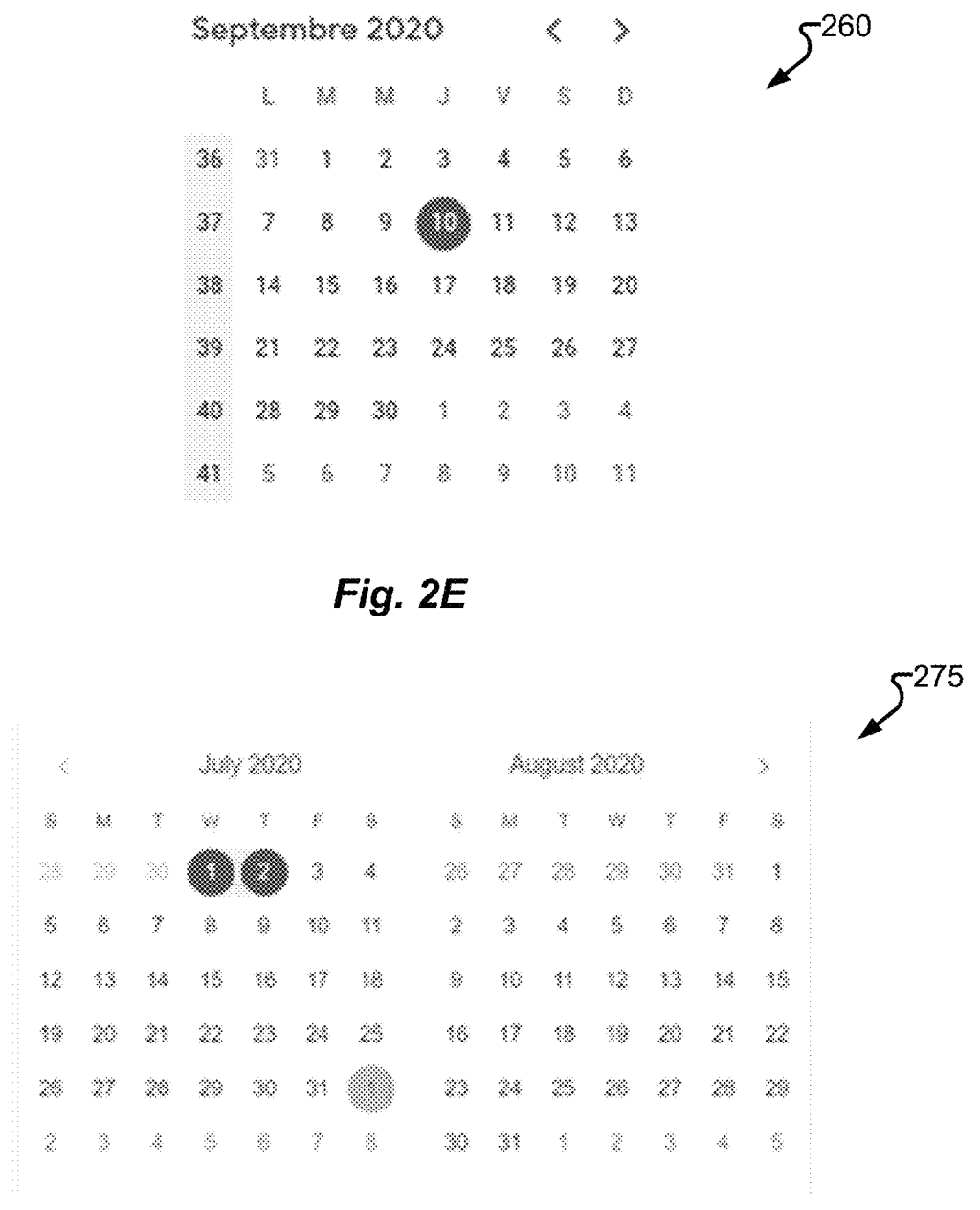
Figure 2G:
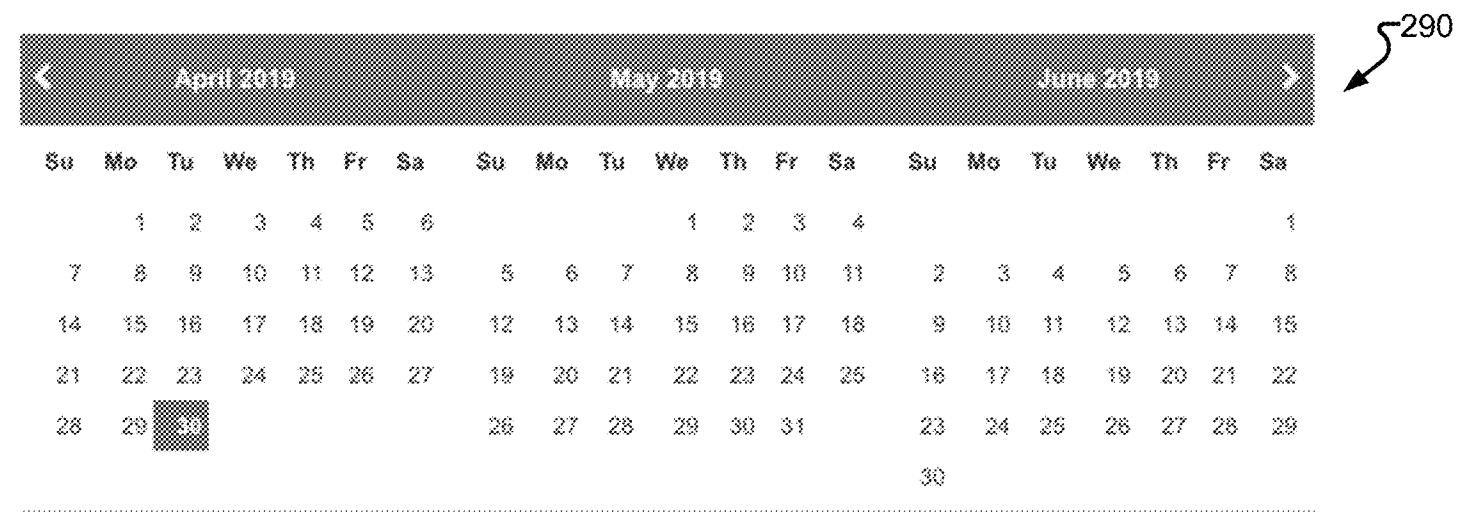

As illustrated in FIG. 2C, weeks of a GUI calendar 230 may begin on Mondays. As illustrated in FIG. 2D, a GUI calendar 245 may also include week numbers indicating a week of the year for each week of the calendar. As illustrated in FIG. 2E, a GUI calendar 260 may be in a language other than English. The calendar 260 illustrated in FIG. 2E appears to be in French based on the spelling of the month and the first letters of the days. As illustrated in FIG. 2F, a GUI calendar 275 may be a two-by-one calendar showing two months side by side. As illustrated in FIG. 2G, a GUI calendar 290 may be a three-by-one calendar showing three months side by side.

When a calendar is displayed in a GUI, a current date and/or a pre-selected date may be highlighted. In some instances, a pre-selected range of dates may be highlighted. To select a date in the GUI, typically a mouse cursor must be placed in a general vicinity of the desired number. For example, an unseen grid of GUI buttons may effectively be over the dates of the calendar such that a click within the grid will select the nearest date number.

Any of these GUI calendars may be used as an input to the methods and systems described herein.

Figure 3A:
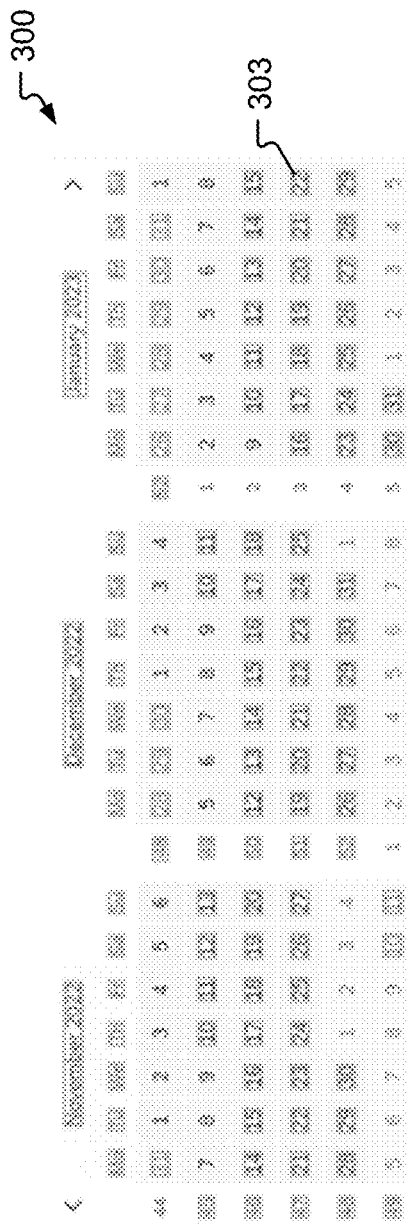
FIG. 3A is an illustration of a GUI after OCR in accordance with one or more of the embodiments described herein.

As illustrated in FIG. 3A, when OCR is used to identify text in a GUI calendar 300, some numbers may not be identified. Bounding boxes 303, shown for illustration purposes, indicate text in the GUI calendar 300 identified using OCR.

Figure 3B:
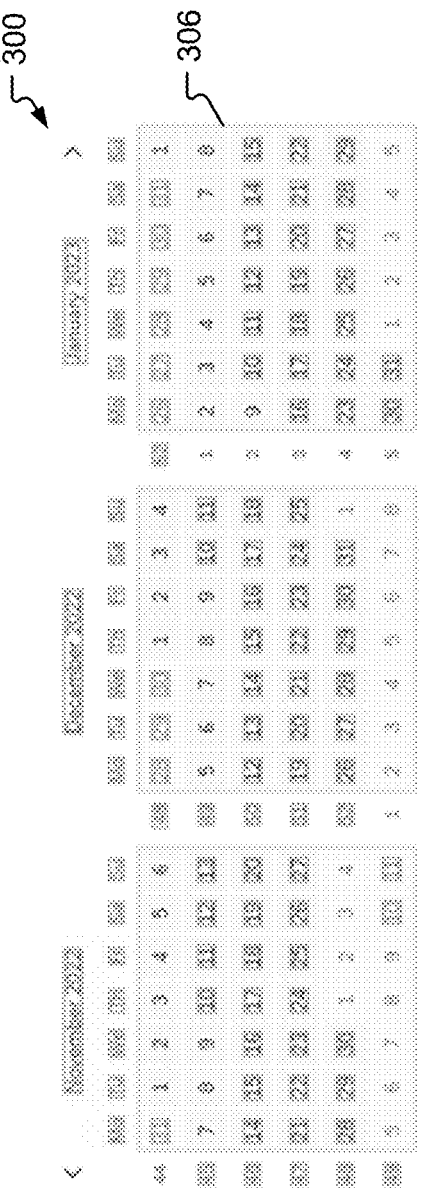
FIG. 3B is an illustration of a GUI after OCR and image recognition to highlight box around date grid in accordance with one or more of the embodiments described herein.
Figure 4:
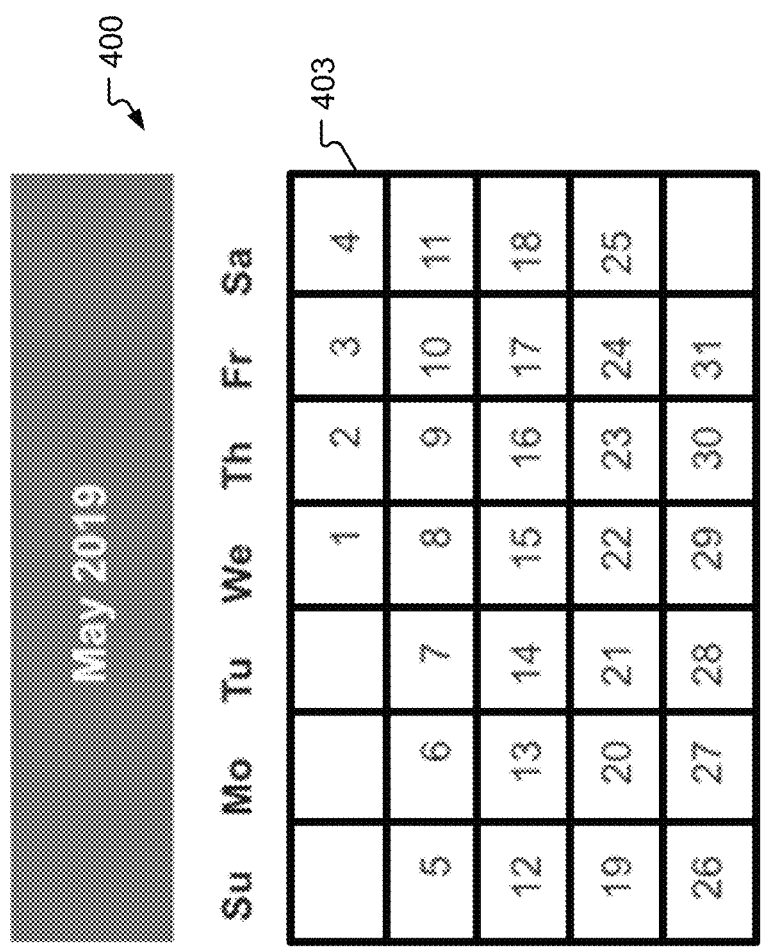
FIG. 4 is an illustration of a simulation grid overlayed on a calendar in accordance with one or more of the embodiments described herein.

As illustrated in FIG. 3B, using a system or method as described herein, a computer system may be enabled to generate a date box 306 encircling the dates of a particular calendar. As illustrated in FIG. 4, a grid 403 may be overlayed on a GUI calendar 400 using a date box as described herein.

Figure 5A:
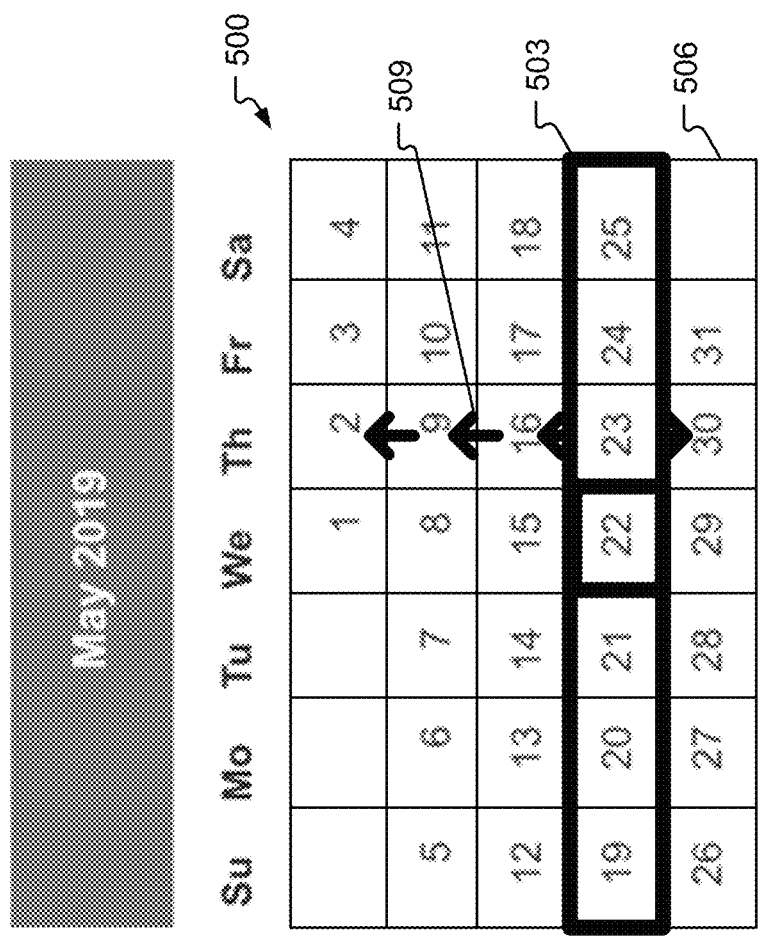
FIG. 5A is an illustration of upward and downward speculation and verification in accordance with one or more of the embodiments described herein.

As illustrated in FIG. 5A, and as described in greater detail below, upward, and downward speculation and verification may be used to identify and/or verify a week 503 of a GUI calendar 500 containing a date square associated with a requested date. As illustrated by arrows 509, upward and downward speculation may comprise counting squares of a grid 506 above and below the week 503 to verify the week is in an expected row.

Figure 5B:
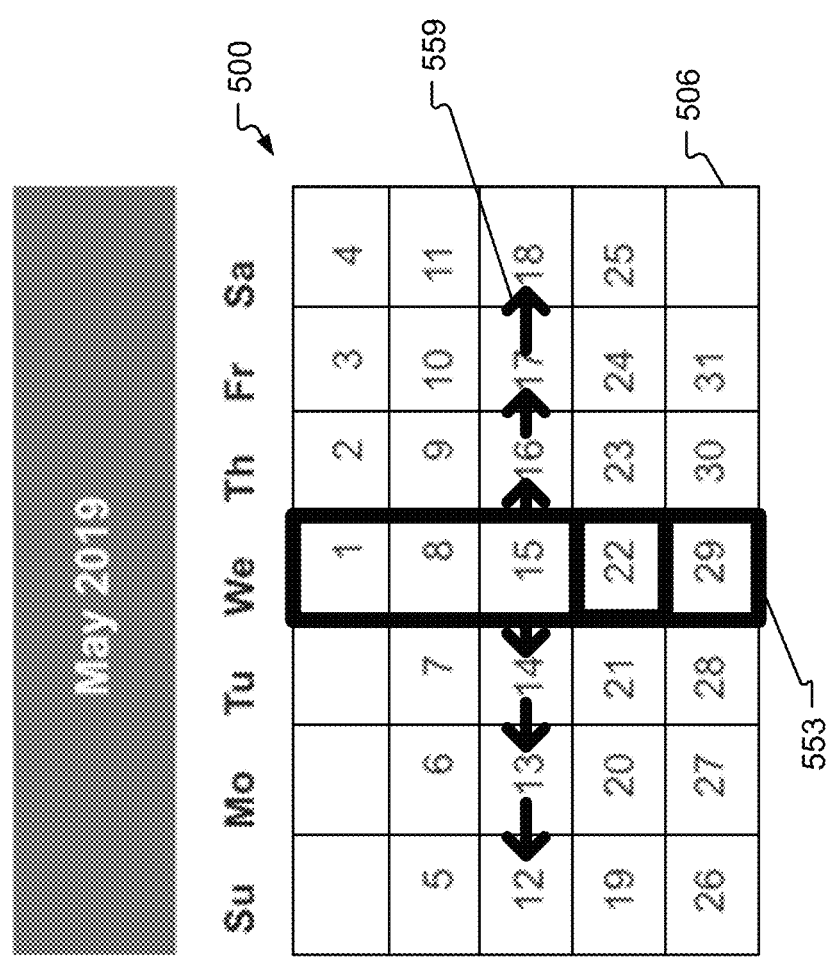
FIG. 5B is an illustration of leftward and rightward speculation and verification in accordance with one or more of the embodiments described herein.

As illustrated in FIG. 5B, and as described in greater detail below, leftward, and rightward speculation and verification may be used to identify and/or verify a weekday 553 of a GUI calendar 500 containing a date square associated with a requested date. As illustrated by arrows 559, leftward and rightward speculation may comprise counting squares of a grid 506 to the left and to the right of the date square to verify the week is in an expected column.

Figure 6:
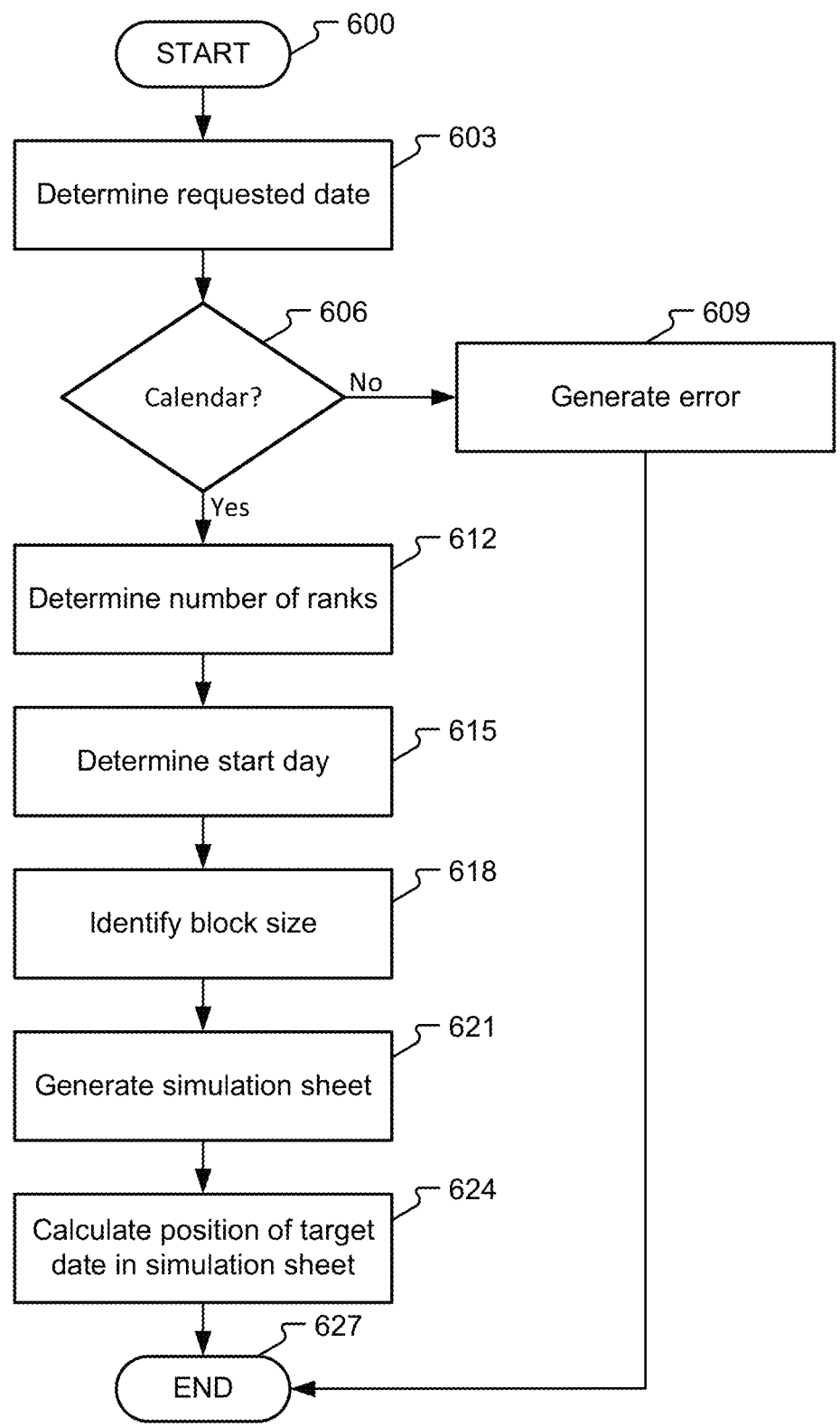
FIG. 6 is a flowchart of a method in accordance with one or more of the embodiments described herein.

As illustrated in FIG. 6, a method may be performed using, for example, a computing device 103 as illustrated in FIG. 1. The method may begin at 600. In some embodiments, the method may be used by a user of a computing device 103. The user may seek to have a date automatically selected in a GUI. The steps of the method may be performed by a processor 106 of a computing device 103. In some embodiments, the method may be performed automatically without requiring any instructions from a user. For example, the method of FIG. 6 may be performed in response to new data being received.

As described herein, a method may be used to select a date from a calendar picker user interface (UI) element within a GUI. The GUI may be a screenshot of a website or may be rendered by the computing device 103 performing the method by reading an HTML file or other type of file to create a visual representation of the GUI. The method may be performed by a computing device 103 but may be controlled in part by a user of another computing device such as a computing device in communication with the computing device 103 via a network connection.

In some embodiments, the method may be performed as part of an automated testing system. For example, an automated testing system may be a software application configured to test one or more other software applications, programs, websites, or other programmed media. Testing may comprise loading a website in a browser, capturing a screenshot of a GUI, and using the screenshot of the GUI to perform an automated test. The automated testing system may be configured to simulate the experience of a human using the application, program, website, etc., being tested by viewing a GUI as a human would view the GUI and interacting with the GUI as a human would interact with the GUI. Such an automated testing system may enable developers of the application, program, website, etc., being tested to quickly debug the application, program, website, etc., being tested without being required to interact manually, saving time, money, and stress for developers while providing a more thorough and accurate debugging.

An output of the method may be shared over a network. For example, the method may be performed by a network device and the output of the method may be shared by a user of a user device across a network connection. Similarly, input data used in the method, such as screenshots of GUIs, may be received by the computing device 103 performing the method over a network.

Using a method as described herein, a computing device 103 may be enabled to automatically identify and/or select a date from a calendar within a GUI. The method overcomes deficiencies experienced when relying upon OCR or other methods of analyzing GUI calendars.

At 603, the method may comprise determining a requested target date. Determining a requested target date may comprise identifying a date to be chosen from a GUI calendar.

A date may comprise data including a month, a day, and a year. The date may be in a format such as MMDDYY, MMDDYYYY, MDYY, etc. For example, Jan. 30, 2025 may be represented as one or more of: Jan. 30, 2025; Jan. 30, 2025; Jan. 30, 2025; 01302025; 1302025; 013025; 13025; etc.

In some embodiments, the requested target date may be determined based on user input. For example, a user may input a date which may be received, directly or indirectly, by the computing device performing the method. The date may be input, for example, using an input/output device 133 and/or via a networked component 130.

In some embodiments, the computing device may be configured to process a user input to determine a requested date. For example, a user may input date in a plain format such as "the fifth of May" which the computing device may be configured to associate with May 5th of the current year.

In some embodiments, the requested target date may be selected by the computing device 103 based on data received from a network location such as via a networked component 130, from memory 136, and/or from data storage 139.

In some embodiments, the requested target date may be selected by the computing device 103 based on data in a data file. For example, the computing device 103 may consult a list of dates to be chosen and choose a next target date from the list. Such a data file may be stored in data storage 112 and/or memory 109. In some embodiments, the requested target date may be chosen randomly. For example, the processor 106 may be configured to execute a random number generator or other randomizer function to select a date.

At 606, the method may comprise detecting a calendar in a GUI. Detecting a calendar in a GUI may first comprise obtaining a GUI. The GUI may be a webpage or a GUI of an application or another type of user interface. Obtaining a GUI may comprise rendering a file, such as an HTML or other file type, in an application such as a browser. Capturing a screenshot or otherwise capturing a visualization of the file. Obtaining a GUI may comprise receiving an image file containing an image of a GUI. Obtaining a GUI may comprise downloading an image file from a network location or retrieving an image file from memory.

Once a GUI is obtained, detecting a calendar in the GUI may comprise analyzing the GUI using one or more of a neural network, CNN, or other form of AI, and/or OCR. For example, a neural network, or other form of AI, may be trained to detect a calendar GUI, also may be referred to as a calendar selector or calendar picker, from within an image.

As illustrated in FIGS. 2A-G, and as discussed above, calendar GUIs may take a variety of forms.

The same or similar calendar GUIs may be used to train a neural network such as a CNN to identify images containing a calendar GUI. In some embodiments, a variety of images of webpages or HTML files including web pages may be used as training material. In some embodiments, the computer system may be enabled to render an HTML file or other type of file in one or more different browsers such as Internet Explorer, Microsoft Edge, Chrome, Safari, Firefox, etc.

Detecting the calendar in the GUI may comprise locating the calendar within the GUI. In some embodiments, detecting the calendar may comprise utilizing OCR or a form of computer vision or image processing to identify characteristics of a calendar within the GUI. For example, a month name may be identified and recognized, one or more numbers which may be expected to be found within a GUI calendar, e.g., 1-31, may be identified and recognized, day names, e.g., Monday-Sunday, may be identified and recognized, etc. In some embodiments, a virtual bounding box may be generated to encompass any calendar-related features identified and/or recognized in the GUI. For example, a coordinate of a region surrounding the calendar may be determined. By selecting an upper leftmost point of the recognized or identified calendar elements and a lower rightmost point of the recognized or identified calendar elements, a computer system may be enabled to virtually generate a bounding box around the calendar within the GUI.

In some embodiments, pixels making up the calendar may be determined or estimated. For example, prior to generating a bounding box, the computer system may be enabled to determine which pixels of the GUI are associated with identified and/or recognized elements of a calendar menu. The computer system may be enabled to select all such pixels and other pixels within a particular range of the pixels.

If no calendar is detected in the GUI, the method may continue with notifying a user or otherwise outputting an error message at 609 may end the method at 627.

In some embodiments, the method may further comprise recognizing a month name in the detected calendar. The month name may be recognized for example by processing the image of the GUI using OCR. In some embodiments, the method may further comprise recognizing one or more date numbers in the calendar. The one or more date numbers may be recognized by processing the image of the GUI using OCR.

As illustrated in FIG. 3A, OCR may be imperfect and only a portion of the numbers and text from within a GUI calendar may be identified. The bounding boxes 303 illustrated in FIG. 3A are shown for visualization purposes only and indicate text recognized in the calendar 300 using OCR in one example.

It should be appreciated the systems and methods described herein may be useful even in the scenario that all numbers and text in a GUI calendar are recognized. For example, as illustrated in FIG. 3A, numbers are repeated within a single month calendar. Such as the December 2022 calendar of FIG. 3A which includes two each of numbers 1-8 and 28-30.

At 612, the method may comprise determining a number of ranks in the detected calendar. In some embodiments, the method may also comprise detecting or determining, based on any recognized date numbers, rows within one or more calendars in the GUI.

Context information may additionally be used, for example, in FIG. 3A, numbers from six rows are recognized in the November calendar but only five rows in the December calendar. The processor may be configured to determine, based on the November calendar, the December calendar also has six rows.

The contents of the recognized text may also be used to determine a number of ranks in the calendar. For example, the processor may identify a month with which the calendar is associated and based on the associated month, the processor may determine an expected number of days. Based on the expected number of days, the processor may determine whether another row exists. For example, if in the January 2023 calendar of FIG. 3A, the OCR failed to recognize the days 30 and 31 in the last rank, the processor may be enabled to determine the days 30 and 31 exist in a sixth rank despite not being recognized.

Furthermore, the processor may be enabled to fill in missing data. For example, while no numbers were recognized in the second rank of the January 2023 calendar of FIG. 3A, the processor may be enabled to determine a row of numbers exists between the rank beginning with twenty-six and the rank in which the first recognized number is ten.

The processor may also be enabled to determine unrecognized or unidentified numbers exist as the processor may be enabled to assume the dates of the calendar form a square. As such, a left most recognized number may be used to determine a left edge of the calendar and a rightmost recognized number may be used to determine a right edge calendar. Likewise, uppermost, and lowermost numbers may be used to determine upper and lower edges of the calendar, respectively.

Because some GUI calendars, such as illustrated in FIG. 3A, include week numbers, the processor may be enabled to determine recognized numbers are related to week numbers and not to dates. Such a determination may be made by locating numbers above, below, or near a recognized number and determining the recognized number is not likely a date. Numbers may easily be recognized as dates as date numbers are consecutive and increase by seven vertically.

At 615, the method may comprise identifying a week start day for the detected calendar. For example, a GUI calendar may begin with a Sunday or a Monday. Using OCR, the processor may be enabled to identify a left most day name. Day names may be identified by using OCR to recognize one or more of M, Mo, Mon, Monday, S, Su, Sun, and/or Sunday, and to determine one of the recognized M, Mo, Mon, Monday, S, Su, Sun, and/or Sunday is furthest to the left or otherwise over a first column.

Identifying the week start day may comprise using OCR to recognize one of Tuesday, Wednesday, Thursday, Friday, and Saturday, and using context information to determine a column number for the recognized one of Tuesday, Wednesday, Thursday, Friday, and Saturday. Next, the processor may determine, based on the column number for the recognized Tuesday, Wednesday, Thursday, Friday, and Saturday, a first column is associated with one of Sunday and Monday.

The processor may be enabled to determine a day of the week for any recognized date on a calendar. For example, if the calendar is January 2023, and a recognized date is seventeen, the processor may determine the recognized date of seventeen is in a Tuesday column. If the recognized date of seventeen is in a second column, the processor may determine the week starts on a Monday. If the recognized date of seventeen is in a third column, the processor may determine the week starts on a Sunday.

At 618, the method may comprise identifying a block size for the detected calendar. A block size may be a number of pixels associated with each date of the GUI calendar. Determining a block size may comprise determining a distance between two recognized neighboring date numbers or a distance between a center of two neighboring date numbers. If no two recognized date numbers are neighboring, determining a block size may comprise determining a distance between two recognized non-neighboring date numbers and dividing the distance by an estimated distance in blocks between the two recognized non-neighboring date numbers. For example, if dates three and five are recognized and the distance between the centers of three and five is fifty pixels the block size may be fifty divided by two as the dates three and five should be expected to be two blocks apart, resulting in a block size of twenty-five pixels. In some embodiments, a block width and a block height may be separately determined, though in some embodiments, the block may be assumed to be square.

At 621, the method may comprise generating a simulation sheet. A simulation sheet may comprise, as illustrated in FIG. 4, a grid of squares 403 overlayed on a calendar four hundred detected within a GUI. The squares of the grid of squares may be sized according to the block size determined at 618. The grid of squares may be positioned such that each date of the calendar, regardless of whether the text was recognized, is centered within a square. The grid of square may be an approximation of a selectable area associated with each date of the calendar.

While the simulation sheet illustrated in FIG. 4 is a visual grid of squares 403, it should be appreciated no actual grid of squares may be required to be visually represented. Instead, the simulation sheet may be a logical concept generated by the processor without creating any visualization.

The grid may be, for example, one of a one by seven grid for a single week calendar, a five by seven grid for a calendar with five ranks, or a six by seven grid for a calendar with six ranks.

At 624, the method may comprise identifying a position of the calendar in the GUI associated with the target date based on the identified week start day for the calendar and the recognized one or more date numbers in the calendar.

In some embodiments, the method may further comprise determining an expected position of a target date on the calendar using the generated simulation grid. The expected position may be based on the determined rank and column associated with the determined date. Assuming the first day of the month is in the first rank, simply by knowing the start day (Sunday or Monday) of the calendar, the processor may be enabled to determine expected coordinates of any date in the month. For example, the May 2019 calendar of FIG. 4, because the start day is Sunday, the processor may be enabled to determine automatically that May 1 is in the first rank and the fourth column, that May 13 is in the third rank and the second column, and that May 26 is in the fifth rank and the first column.

The location of position of the calendar in the GUI associated with the date may be identified as coordinates. In some embodiments, a row or rank number and a column number may represent a date position. For example, in the May 2019 calendar of FIG. 4, May 1 may be represented by 4,1; May 13 by 2, 3; and May 26 by 1, 5. It should be appreciated the coordinates of a particular date would change based on the week start day.

A database may be accessible to the processor and may store coordinates for each day of each month for both Sunday-start and Monday-start calendars. In this way, the expected rank and column for a particular day may be determined based on a database entry. In some embodiments, identifying the position of the calendar associated with the target date may comprise identifying a determined rank associated with the determined date in the calendar and/or may comprise identifying a determined column associated with the determined date in the calendar.

In some embodiments, the determined rank may be identified and/or verified using one or more of upward and/or downward speculation and the determined column may be identified and/or verified using leftward and/or rightward speculation.

As illustrated in FIG. 5A, upward and downward speculation may comprise verifying that the identified position within the simulation grid is in the proper rank. In the example illustrated in FIG. 5A, May 22, 2019 is the requested date. The computer system identified the GUI calendar five hundred. The computer system determined the GUI calendar five hundred has a week start day of Sunday. Based on the week start day of Sunday, the computer system has determined May 22, 2019 is in a fourth row, or rank, and in a fourth column of the GUI calendar 500. The computer system may also have determined the calendar five hundred includes five ranks. The computer system has generated a simulation sheet 506 and overlaid the simulation sheet 506 on the GUI calendar five hundred, arranging the simulation sheet 506 such that each square of the simulation sheet 506 is positioned over one or more date numbers recognized using OCR.

To verify the position of the requested date, the computer system may verify one or more of the rank and the column. To verify the rank, the computer system may first identify a rank 503 of the simulation sheet 506 associated with the identified position of the requested date. In the example illustrated in FIG. 5A, the rank 503 is the fourth rank.

Next, the computer system may execute an upward and/or a downward speculation process as illustrated by arrows 509. The computer system may count upward and/or downward from the rank 503 until reaching an end of the date numbers. In this way, the computer system may verify that the identified rank 503 is one up from the bottom-most rank and three down from the upper-most rank.

To verify the identified column, the computer system may first identify a column 553 of the simulation sheet 506 associated with the identified position of the requested date as illustrated in FIG. 5B. In the example illustrated in FIG. 5B, the column 553 is the fourth column.

Next, the computer system may execute a leftward and/or a rightward speculation process as illustrated by arrows 559. The computer system may count leftward and/or rightward from the column 553 until reaching an end of the date numbers. In this way, the computer system may verify that the identified column 553 is three columns from each of the left-most column and the right most column.

At 627, the method may end. In some embodiments, the end of the method may comprise selecting the position of the calendar in the GUI associated with the target date. Selecting the position of the calendar in the GUI may comprise moving a cursor to the position and/or clicking the position. In this way, using a method as described herein, the computer system may be enabled to automatically select a date from a calendar GUI after being provided only a file and a requested date. In some embodiments, the cursor may be moved automatically based on a location of the position of the calendar within the GUI. The location of the position of the calendar may be a coordinate, such as on an x-, y-axis, or may be a particular pixel or group of pixels within the GUI. For example, the position may be a number on the GUI calendar, and the location of the position may be a pixel or group of pixels centered on the position. The cursor may be moved to the location of the position, whether a coordinate or a particular pixel or group of pixels.

In some embodiments, automatically selecting the date for the calendar may trigger a particular action, such as a testing event. For example, selecting the date may cause one or more packets of data to be generated and/or transmitted on, for example, a wire. Such packets may be recorded and/or may be used to automatically repeat the same process of selecting a date without a GUI to be input.

It should be appreciated the method may continue for additional GUIs and/or additional dates. For example, in some embodiments, the same or similar methods may be used to select more than one date. For example, a range of dates, with a start date and an end date may be selected by the computer system. In some an embodiment, the method may be performed using two dates as target dates. The computer system may in some embodiments locate and/or select a first target date before locating and/or selecting a second target date. It should be appreciated the first and second target dates may be in different months and may not be on the same calendar.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

A neural network, as described herein may comprise layers of logical nodes having an input and an output. If an output is below a self-determined threshold level, the output may be omitted (i.e., the inputs may be within an inactive response portion of a scale and provide no output), if an output is above the threshold, the output may be provided (i.e., the inputs may be within the active response portion of the scale and provide the output). The particular placement of active and inactive delineation may be provided as a step or steps. Multiple inputs into a node may produce a multi-dimensional plane (e.g., hyperplane) to delineate a combination of inputs that are active or inactive.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, sub combinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components by, in one or more embodiments, voltages in memory circuits, configuration of switching circuits, and/or by selective use of particular logic gate circuits. Additionally, or alternatively, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud," multi-purpose processor array(s), cluster(s), etc.) and/or may be co-located with a microprocessor performing other processing operations. Any one or more microprocessors may be integrated into a single processing appliance (e.g., computer, server, blade, etc.) or located entirely, or in part, in a discrete component and connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, a first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion microprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22nm Haswell, Intel® Core® i5-3570K 22nm Ivy Bridge, the AMD® FX™ family of microprocessors, AMD® FX-4300, FX-6300, and FX-8350 32nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Embodiments include a computer system comprising: a processor; and a computer-readable storage medium storing computer-readable instructions which, when executed by a processor, cause the processor to execute a method, the method comprising: determining a target date; detecting a calendar in a graphical user interface (GUI); recognizing a month name in the detected calendar; recognizing one or more date numbers in the detected calendar; identifying a week start day for the detected calendar; identifying a position in the detected calendar associated with the target date based on the identified week start day for the detected calendar and the recognized one or more date numbers in the detected calendar; and automatically selecting the position in the detected calendar associated with the target date.

Embodiments include a computer program product comprising: a non-transitory computer-readable storage medium having computer-readable program code embodied therewith, the computer-readable program code configured, when executed by a processor, to execute a method, the method comprising: determining a target date; detecting a calendar in a graphical user interface (GUI); recognizing a month name in the detected calendar; recognizing one or more date numbers in the detected calendar; identifying a week start day for the detected calendar; identifying a position in the detected calendar associated with the target date based on the identified week start day for the detected calendar and the recognized one or more date numbers in the detected calendar; and automatically selecting the position in the detected calendar associated with the target date.

Embodiments of the present disclosure include a method for automatically selecting a target date in a GUI calendar, the method comprising: determining a target date; detecting a calendar in a graphical user interface (GUI); recognizing a month name in the detected calendar; recognizing one or more date numbers in the detected calendar; identifying a week start day for the detected calendar; identifying a position in the detected calendar associated with the target date based on the identified week start day for the detected calendar and the recognized one or more date numbers in the detected calendar; and automatically selecting the position in the detected calendar associated with the target date.

Aspects of the above methods include determining a rank and a column associated with the target date.

Aspects of the above methods include wherein the column is determined based at least in part on the recognized week start day.

Aspects of the above methods include wherein the rank, and the column are determined based on a database entry.

Aspects of the above methods include wherein identifying the position in the detected calendar associated with the target date comprises locating the rank in the detected calendar.

Aspects of the above methods include wherein the rank is located using one or more of upward and downward speculation.

Aspects of the above methods include wherein the position in the detected calendar associated with the target date is identified based on the rank and the column.

Aspects of the above methods include wherein one or more of the month name, date numbers, and week start day are recognized using OCR.

Aspects of the above methods include wherein identifying the week start day for the detected calendar comprises: using OCR to recognize one of Tuesday, Wednesday, Thursday, Friday, and Saturday; determining a column number for the recognized one of Tuesday, Wednesday, Thursday, Friday, and Saturday; and determining, based on the column number for the recognized one of Tuesday, Wednesday, Thursday, Friday, and Saturday, a first column is associated with one of Sunday and Monday.

Aspects of the above methods include wherein identifying the position in the detected calendar associated with the target date comprises generating a grid of squares.

Aspects of the above methods include wherein identifying the position in the detected calendar associated with the target date further comprises determining a block size based on a distance between two recognized date numbers in the detected calendar.

Aspects of the above methods include wherein each square of the grid of squares is associated with a date in the detected calendar.

Aspects of the above methods include wherein selecting the position in the detected calendar comprises moving a cursor to the position in the detected calendar.

What is claimed is:

1. A method for automatically selecting a target date in an image of a calendar in a graphical user interface (GUI), the method comprising:
   selecting, with a processor, the target date by one of executing a random number generator, selecting the target date based on data in a data file, receiving data from a network location, and receiving a selection from a user;
   obtaining, with the processor, the GUI, wherein the GUI includes the image of the calendar in the GUI, wherein the image of the calendar comprises a visual representation of a month calendar, and wherein a position in the image of the calendar is associated with the target date;
   detecting, with the processor, the image of the calendar in the GUI;
   recognizing, with the processor, a month name in the image of the calendar;
   recognizing, with the processor, one or more numbers in the image of the calendar;
   identifying, with the processor, a week start day for the image of the calendar;
   identifying, with the processor, the position in the image of the calendar associated with the target date based on the identified week start day for the image of the calendar and the recognized one or more numbers in the image of the calendar; and
   automatically, with the processor, selecting the position in the image of the calendar associated with the target date without material human input by automatically, without material human input, moving a cursor to the position in the image of the calendar and clicking the position with the cursor.

2. The method of claim 1, further comprising determining, with the processor, a rank and a column associated with the target date.

3. The method of claim 2, wherein the column is determined based at least in part on the identified week start day.

4. The method of claim 2, wherein the rank and the column are determined based at least in part on a database entry.

5. The method of claim 2, wherein identifying the position in the image of the calendar associated with the target date comprises locating the rank in the image of the calendar.

6. The method of claim 5, wherein the rank is located using one or more of upward and downward speculation.

7. The method of claim 2, wherein the position in the image of the calendar associated with the target date is identified based on the rank and the column.

8. The method of claim 1, further comprising:
   selecting, with the processor, a second target date, wherein the image of the calendar includes a second position associated with the second target date;
   identifying, with the processor, the second position in the image of the calendar associated with the second target date; and
   automatically selecting, with the processor, the second position in the image of the calendar associated with the second target date.

9. The method of claim 1, wherein identifying the week start day for the image of the calendar comprises:
   using, with the processor, optical character recognition (OCR) to recognize a label corresponding to one of Tuesday, Wednesday, Thursday, Friday, and Saturday;
   determining, with the processor, a column number for the recognized label corresponding to one of Tuesday, Wednesday, Thursday, Friday, and Saturday; and
   determining, with the processor, based on the column number for the recognized label corresponding to one of Tuesday, Wednesday, Thursday, Friday, and Saturday, a first column associated with one of Sunday and Monday.

10. The method of claim 1, wherein identifying the position in the image of the calendar associated with the target date comprises generating a grid of squares.

11. The method of claim 10, wherein identifying the position in the image of the calendar associated with the target date further comprises determining a block size based on a distance between two recognized date numbers in the image of the calendar.

12. The method of claim 11, wherein each square of the grid of squares is associated with a date in the image of the calendar.

13. The method of claim 1, wherein obtaining the GUI comprises loading a website in a browser and capturing a screenshot of the GUI, and wherein detecting the image of the calendar in the GUI comprises analyzing the screenshot of the GUI using a neural network.

14. The method of claim 1, wherein receiving the selection of the target date comprises executing the random number generator to select the target date randomly.

15. A computer system comprising:
   a processor; and
   a computer-readable storage medium storing computer-readable instructions which, when executed by the processor, cause the processor to execute a method, the method comprising:
      selecting a target date by one of executing a random number generator, selecting the target date based on data in a data file, receiving data from a network location, and receiving a selection from a user;
      obtaining a graphical user interface (GUI), wherein the GUI includes an image of a calendar in the GUI, wherein the image of the calendar comprises a visual representation of a month calendar, and wherein a position in the image of the calendar is associated with the target date;
      detecting the image of the calendar in the GUI;
      recognizing a month name in the image of the calendar;
      recognizing one or more numbers in the image of the calendar;
      identifying a week start day for the image of the calendar;
      identifying the position in the image of the calendar associated with the target date based on the identified week start day for the image of the calendar and the recognized one or more numbers in the image of the calendar; and
      automatically selecting the position in the image of the calendar associated with the target date without material human input by automatically, without material human input, moving a cursor to the position in the image of the calendar and clicking the position with the cursor.

16. The computer system of claim 15, wherein the method further comprises determining a rank and a column associated with the target date.

17. The computer system of claim 16, wherein the column is determined based at least in part on the identified week start day.

18. The computer system of claim 16, wherein the rank and the column are determined based at least in part on a database entry.

19. A computer program product comprising:
a non-transitory computer-readable storage medium having computer-readable program code embodied therewith, the computer-readable program code configured, when executed by a processor, to execute a method, the method comprising:
selecting a target date by one of executing a random number generator, selecting the target date based on data in a data file, receiving data from a network location, and receiving a selection from a user;
obtaining a graphical user interface (GUI), wherein the GUI includes an image of a calendar in the GUI, wherein the image of the calendar comprises a visual representation of a month calendar, and wherein a position in the image of the calendar is associated with the target date;
detecting the image of the calendar in the GUI;
recognizing a month name in the image of the calendar;
recognizing one or more numbers in the image of the calendar;
identifying a week start day for the image of the calendar;
identifying the position in the image of the calendar associated with the target date based on the identified week start day for the image of the calendar and the recognized one or more numbers in the image of the calendar; and
automatically selecting the position in the image of the calendar associated with the target date without material human input by automatically, without material human input, moving a cursor to the position in the image of the calendar and clicking the position with the cursor.

20. The computer program product of claim 19, wherein the method further comprises determining a rank and a column associated with the target date.

* * * * *